Oct. 24, 1933.      J. L. HIPPLE      1,932,107
GROUND MARKER
Filed May 31, 1930      2 Sheets-Sheet 1
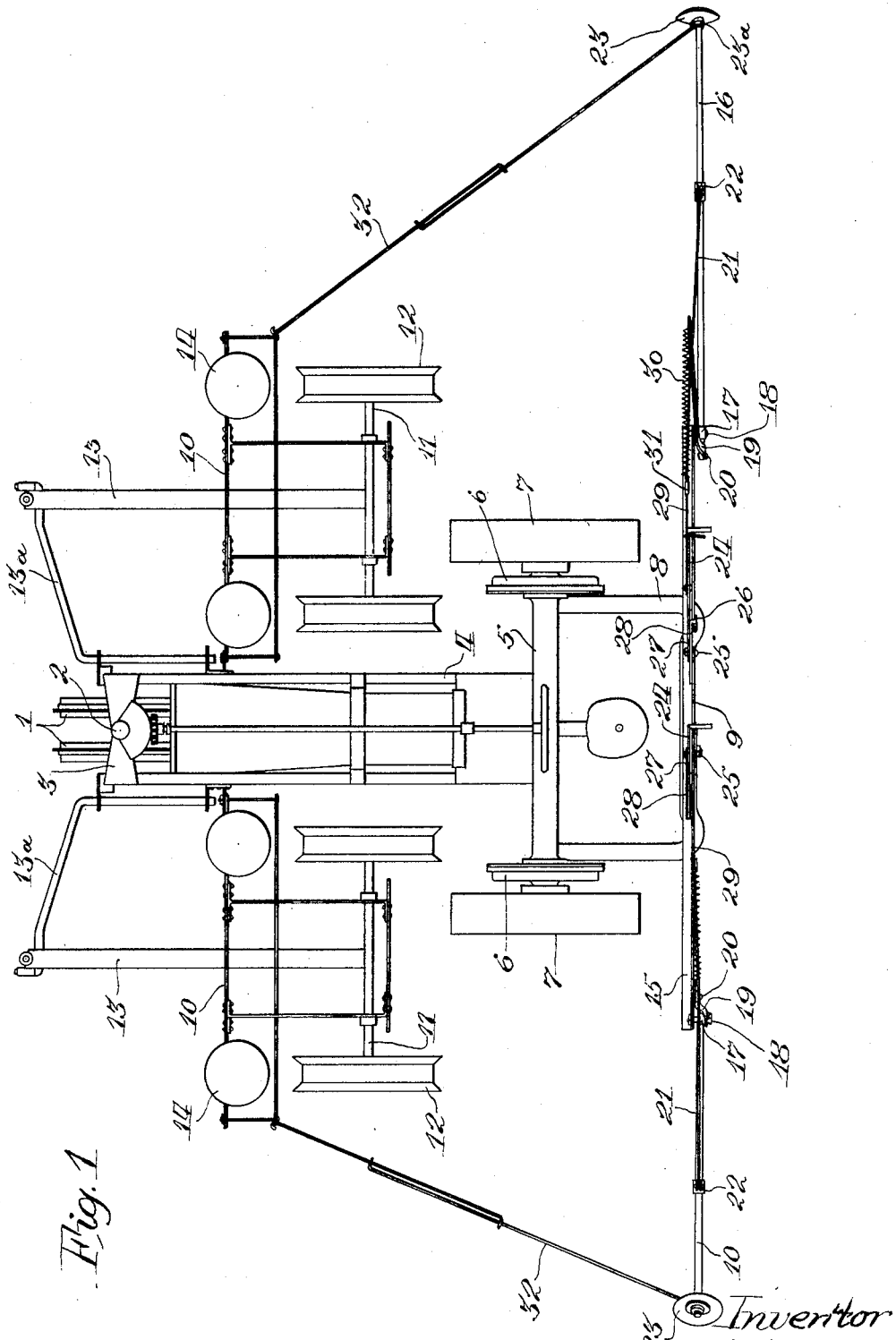

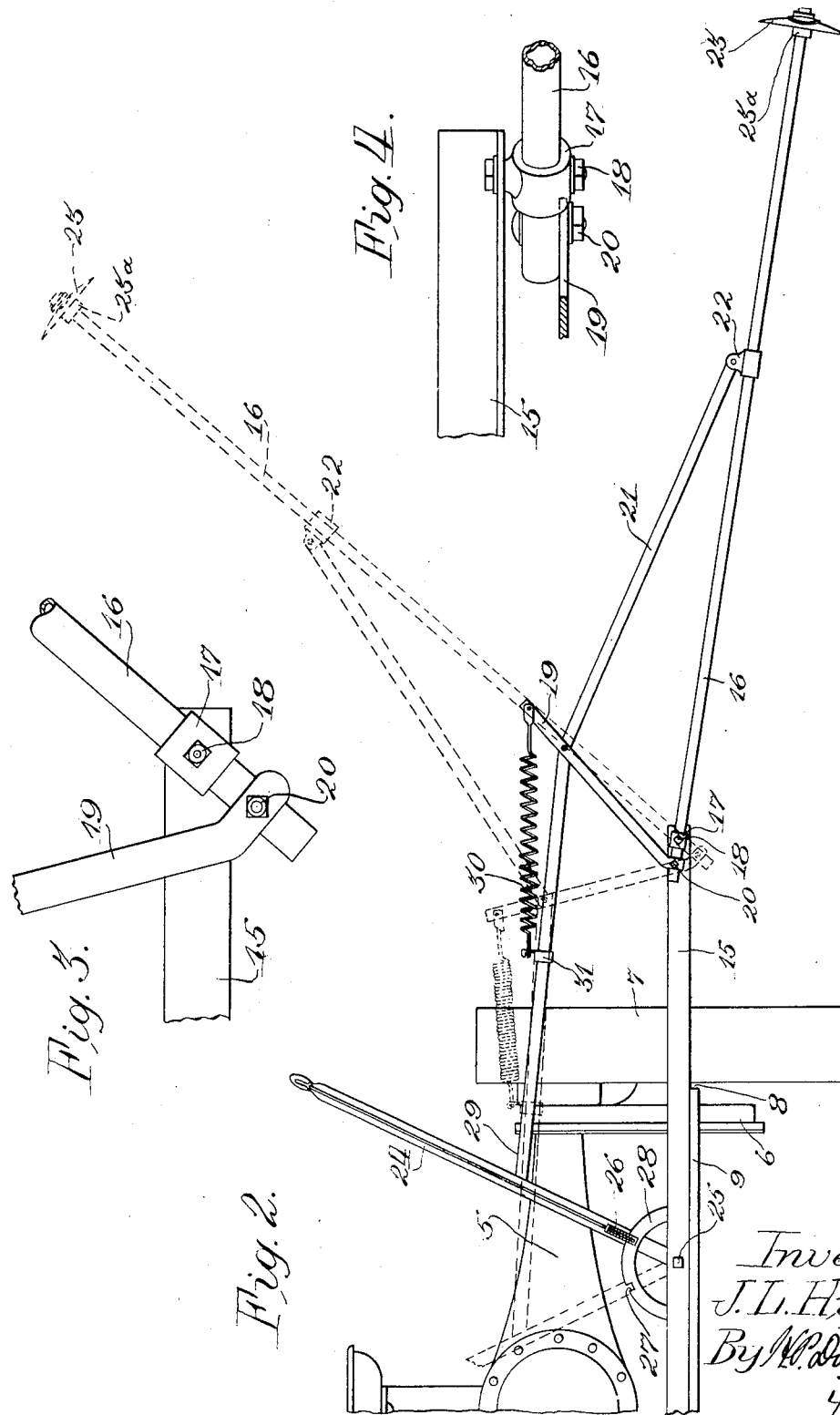

Patented Oct. 24, 1933

1,932,107

UNITED STATES PATENT OFFICE 1,932,107

GROUND MARKER

James L. Hipple, Canton, Ill., assignor to International Harvester Company, a corporation of New Jersey Application May 31, 1930. Serial No. 458,002

3 Claims. (Cl. 97—230)

This invention relates to a marker particularly adapted for planting row crops.

The principal object of the invention is to provide an improved marker and means for lowering and raising it into and out of operative position with a minimum of effort. This and other objects, which will be apparent, are attained by the structure illustrated in the drawings, wherein:

Figure 1 is a plan view of a side connected four row tractor planter showing an embodiment of the marker of the invention;

Figure 2 is a rear elevation showing the marker in operative position, and in folded position in dotted lines; and, Figures 3 and 4 are enlarged details of the pivotal connection between the marker bar and its supporting structure.

The tractor shown diagrammatically in the drawings is a tricycle type of a well known construction. Closely spaced front wheels 1 are mounted on a steering post 2 below the front frame member 3 of the tractor. Side frame members 4 are attached to the front frame member and to the rear axle housing 5. Offset housings 6 at the end of the housing 5 provide for gearing adapted to drive the wide tread wheels 7. A U-shaped drawbar 8 is attached to the housing 6 and extends rearwardly with the transverse portion 9 being rearward of the wheels 7.

The planters are attached at opposite sides of the tractor in laterally spaced relation for planting four rows at equal distances apart. The planters consist essentially of a frame 10, an axle 11, wheels 12, a tongue 13 and seeding mechanism, the only parts of which that are shown being the seed hopper 14. The tongues 13 of the planters are attached to drawbars 13$^a$ extending laterally from the tractor frame.

The mounting of the planter with respect to the tractor is shown diagrammatically in this application for the purpose of illustrating a practicable embodiment of the invention. The U. S. Patent #1,775,639 describes and claims the four-row tractor planter shown for illustrating this invention.

An angle bar 15 is bolted securely to the transverse portion 9 of the drawbar and extends laterally to each side behind the wheels 7. The bar 15 forms a support for the marker bars 16, which are pivotally connected adjacent their ends to the ends of the bar 15. As the markers on each side are exactly similar in construction, only one has been shown in Figure 2, and the description will be limited to this showing. The planter frames, the tractor frame, the tractor drawbar, and the supporting bar 15 may be considered as a frame structure to which the marking devices are attached in such manner that a guide mark or furrow can be formed by the respective markers in proper relation to the spacing of the planter units on the planter frames.

As shown in Figures 3 and 4 the marker bar 16 is in the form of a pipe, and a bracket 17 having a circular bore therethrough for fitting over the pipe provides means for pivotally securing the pipe to the bar 15. A bolt 18 extends through the angle bar 15, the bracket 17 and the pipe 16.

The bracket 17 is secured to the marker bar 16 at a point spaced from the end. At the end, a bar 19 is connected by a bolt 20. The bar 19 extends angularly upward with respect to the marker bar 16. A second bar 21 is connected to a point on the bar 19 intermediate its ends and to a bracket 22 on bar 16. A concave marking disk 23 is secured to the outside end of the bar 16 by means of a collar 23$^a$.

A lever 24 pivoted to the bar 15 by a bolt 25 is provided with a hand operated latch 26 adapted to engage the notch 27 in an arcuate sector 28 which holds the marker in inoperative position. The sector 28 is secured to the bar 15, its center being the same as the pivot point of the lever 24. A link 29 is pivotally attached to the lever 24 intermediate its ends and to the bar 19 intermediate its ends. In the particular embodiment shown, the link 29 is attached to the bar 19 at the same point at which the bar 21 is attached. A tension spring 30 is attached to the end of the bar 19 and to a bracket 31 on the link 29. The bracket 31 is adjustable longitudinally on the link 29 to adjust the tension of the spring 30.

A guy rod 32 is pivotally attached to the collar 23$^a$, which supports the marking disk, and to a point on the planter frame 10. The guy rod is in two sections, the sections being adjustable longitudinally with respect to each other.

In the operation of this device, the latch 26 in lever 24 is released from engagement in the notch 27. There being no other notches in the sector the lever is free to float thereby permitting the marker disk to follow the contour of the ground. The bracket 31 is adjusted on the link 29 to adjust the tension of the spring 30 and to thereby balance the bar 16, so that it will be easily lifted into an upright position by manual operation of the lever 24 retaining sufficient weight on the marker disk to make a proper mark. The length of the guy rod 32 is adjusted to hold the end of the marker bar in proper trailing relation.

It is to be understood that applicant has shown only one preferred embodiment of his improved marking device and that he claims as his invention any modification falling within the scope of the appended claims:

What is claimed is:

1. A marker for row crop implements comprising a frame structure, a marker bar pivoted adjacent one end on said frame structure, a guy rod attached to the marker bar and to a forward point on the frame structure, means for lifting said marker comprising a bar extending angularly upward from said marker bar and being rigidly secured to said bar, a lever pivoted to the frame structure, a link pivotally connecting said bar with the lever, means for locking said lever in position when the marking bar is in lifted position, and a spring attached to the upwardly extending bar and to the link acting to rotate the marker bar about its axis to a lifted position.

2. A marker for row crop implements comprising a frame, a supporting bar positioned transversely of said frame, a marker bar pivotally connected adjacent one end to one end of the supporting bar, means to maintain the marker in an extended position, and means for lifting said bar comprising an upwardly extending bar connected to the marker bar adjacent its pivot axis, a second bar connected to said bar at a point spaced from its pivot point and to the marker intermediate its ends, an upwardly extending lever pivoted on the supporting bar, means for locking said lever in position with the lifting bar in lifted position, a link pivotally attached to the lever and to the upwardly extending bar, and a spring connected to the upwardly extending bar and to said link, said spring acting to rotate the marker bar upwardly about its axis.

3. A marker for row crop implements comprising an implement frame, a supporting bar positioned transversely of said frame, a marker bar pivotally connected adjacent one end to one end of the supporting bar, a marker mounted at the other end of said bar, a guy rod connected to the bar at the same end and extending forwardly to a point on the implement frame, an upwardly extending bar connected to the marker bar at the pivoted end beyond the pivot axis, a second bar connected to said bar at a point spaced from its pivot point and to the marker bar intermediate its ends, an upwardly extending lever pivotally connected to the supporting bar, a latch mechanism adapted to secure said lever in position when the marker bar is in lifted position with respect to the supporting bar, a link pivotally attached to the lever intermediate its ends and to the upwardly extending bar intermediate its ends, and a tension spring secured to the link intermediate its ends and to the upwardly extending bar at a point above the point of attachment of the link.

JAMES L. HIPPLE.